United States Patent
Browne et al.

(10) Patent No.: US 8,061,550 B2
(45) Date of Patent: Nov. 22, 2011

(54) RECONFIGURABLE STORAGE BINS HAVING A STRUCTURAL COMPONENT FORMED OF A SHAPE MEMORY MATERIAL

(75) Inventors: Alan L. Browne, Grosse Pointe, MI (US); Nancy L. Johnson, Northville, MI (US); John A. Cafeo, Farmington, MI (US); Robert R. Mayer, Clio, MI (US); Jan H. Aase, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 11/457,470

(22) Filed: Jul. 14, 2006

(65) Prior Publication Data
US 2008/0011753 A1    Jan. 17, 2008

(51) Int. Cl.
*B65D 6/16* (2006.01)
*B60R 7/04* (2006.01)

(52) U.S. Cl. ......... 220/666; 220/720; 220/721; 224/275

(58) Field of Classification Search .................. 224/275, 224/485; 220/666, 720, 721
See application file for complete search history.

(56) References Cited

U.S. PATENT DOCUMENTS

| | | | | |
|---|---|---|---|---|
| 3,088,771 A * | 5/1963 | Weigle | .......................... | 296/37.5 |
| 3,632,029 A * | 1/1972 | Sonner | .......................... | 224/275 |
| 5,213,418 A * | 5/1993 | Dancy et al. | ....................... | 383/6 |
| 5,803,325 A * | 9/1998 | Wang | .............................. | 224/275 |
| 6,626,337 B1 * | 9/2003 | Cox | .............................. | 224/275 |
| 7,067,737 B2 * | 6/2006 | Mallen | .......................... | 174/66 |
| 7,322,286 B2 * | 1/2008 | Labeille et al. | ............... | 100/211 |
| 2001/0011664 A1* | 8/2001 | Meritt | ............................. | 224/275 |
| 2003/0160055 A1* | 8/2003 | Stewart-Stand | .............. | 220/666 |
| 2005/0092832 A1* | 5/2005 | Gough et al. | ................. | 235/382 |
| 2005/0238262 A1* | 10/2005 | Jenkins | .......................... | 383/89 |
| 2006/0037983 A1* | 2/2006 | Saxton | .......................... | 224/275 |
| 2006/0266754 A1* | 11/2006 | Carmona | ....................... | 220/666 |

* cited by examiner

*Primary Examiner* — Mickey Yu
*Assistant Examiner* — Niki Eloshway

(57) ABSTRACT

Reconfigurable bins include at least one structural component formed of shape memory materials such as a shape memory polymer, a shape memory alloy, or a combination thereof. The shape memory material is in operative communication with an activation device adapted to provide an activation signal effective to change at least one attribute of the shape memory material such that the bin can be reconfigured from a first shape to a second shape. The reconfigurable bin can include a mesh network or may be formed of panels or a combination panels and mesh.

8 Claims, 3 Drawing Sheets

RECONFIGURABLE STORAGE BINS HAVING A STRUCTURAL COMPONENT FORMED OF A SHAPE MEMORY MATERIAL

BACKGROUND

The present disclosure generally relates to reconfigurable storage bins and, more particularly, to reconfigurable storage bins that can be reversibly reconfigured from a first rigid shape to a second rigid shape and vice versa or reconfigured by selective changes in modulus properties.

It is known to provide automotive interiors with various trim assemblies to improve the aesthetic appearance of the automotive interior and for the comfort and convenience of vehicle occupants. Examples of these interior trim assemblies include the instrument panels, armrests, door trim panels, and consoles. In many of these trim assemblies, various storage compartments are incorporated therein that allow the vehicle occupant to conveniently store one or more items, such as tissue, coins, maps, pens, paper, and various other items typically carried in a vehicle. One such compartment is an open-ended map pocket typically carried in the lower portion of the door trim assembly. FIG. 1 provides such an example. The storage compartment, i.e., bin, 10 is typically mounted onto or integrated with an interior door trim panel 12. Storage compartments for automotive interiors are of a fixed dimension that can generally be used to contain articles having smaller dimensions. Articles having a larger dimension cannot be accommodated. Moreover, even if the storage bin can accommodate the article, because the storage compartment is of a rigid fixed construction, the articles contained therein are prone to movement (and breakage or spillage) within the compartment while the vehicle is in motion.

Some storage compartments utilize portions of the structure that can provide some movement or are composed of a net (i.e., mesh) design such as is shown in FIG. 2, which shows the net design 14 attached to a back surface 16 of an automotive seat 18. The net 14 is typically formed of a nylon material that is secured to the surface on two or three sides to form a sleeve or pocket, respectively. An elastic band 20 may be secured to the netting at the openings provided by the netting with each end of the elastic band secured to the seatback or a fixed point on the netting. In this manner, an end user elastically opens the pocket to allow an object to be inserted or withdrawn. In some net designs, the design is removable. Movement of an article within and out of the net configuration or the configuration in which the sides can be manipulated are manual operations that must be provided by the end user. Moreover, both of the configurations are generally static and limited to the inherent properties of the materials used. The prior art design materials cannot be selectively reconfigured.

What is needed are reconfigurable storage bins that can be selectively reconfigured to accommodate or contain a variety of articles.

BRIEF SUMMARY

Disclosed herein are reconfigurable bins and methods of inserting an article into the reconfigurable bin. In one embodiment, the reconfigurable bin comprises a structural component comprising a shape memory material configured to undergo a change in a modulus of elasticity and/or a shape orientation upon receipt of an activation signal, wherein the change in the modulus of elasticity and/or shape orientation or stiffness/flexibility results in a change in a shape of the structural component.

An automotive interior surface comprises a stationary surface; and a reconfigurable bin attached to the stationary surface, wherein the reconfigurable bin comprises a structural component comprising a shape memory material configured to undergo a change in a modulus of elasticity and/or a shape orientation upon receipt of an activation signal, wherein the change in the modulus of elasticity and/or shape orientation results in a change in a shape and/or flexibility/stiffness of the structural component.

A process for reconfiguring a storage bin to accommodate an article comprises inserting the article into an opening of the storage bin, wherein the storage bin comprises a structural component comprising a shape memory material configured to undergo a change in a modulus of elasticity and/or a shape orientation upon receipt of an activation signal, wherein the change in the modulus of elasticity and/or shape orientation results in a change in a shape of the structural component; and activating the shape memory material, wherein the change in the modulus and/or the shape orientation selectively decreases a volume of the storage bin.

In another embodiment, a process for reconfiguring a storage bin to accommodate an article larger than a first opening dimension provided by the reconfigurable bin comprises activating a shape memory material that defines a structural component of the reconfigurable bin, wherein activating the structural component directly increases (or through a change in stiffness permits an increase in) the first opening dimension to a second opening dimension, wherein the second opening dimension is effective to accommodate the article; and inserting the article into the opening of the reconfigurable bin.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
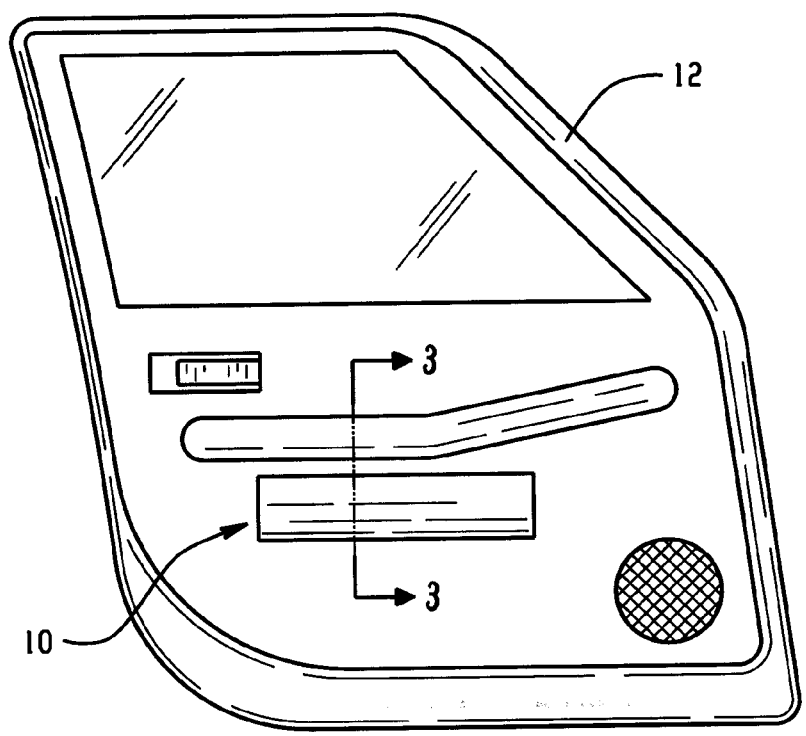
FIG. 1 is a schematic representation of a plan view of an interior door for an automobile that includes an exemplary paneled reconfigurable storage bin.
Figure 2:
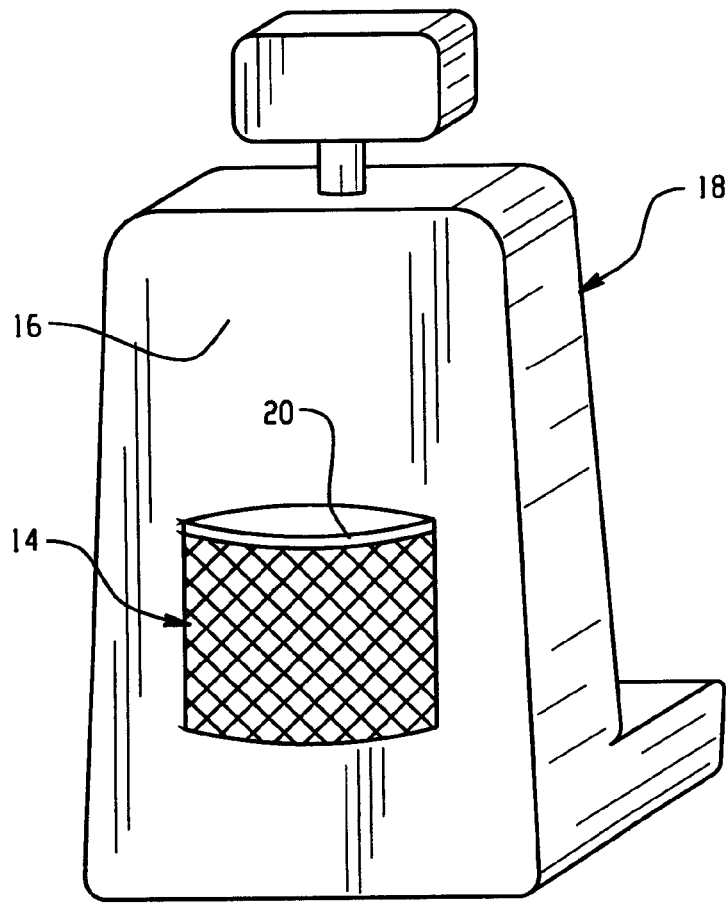
FIG. 2 is a schematic representation of a perspective view of a seat back for an automobile that includes an exemplary reconfigurable storage bin defined by netting.

Disclosed herein are reconfigurable storage bins for use, for example, in automotive interior applications, wherein selective control of the shape and/or size dimension of at least a portion of the storage bins is desired. In contrast to the prior art, the articles and methods disclosed herein are advantageously based on the use of shape memory materials such as shape memory polymers (SMPs), shape memory alloys (SMAs) and electroactive polymers (EAPs). The shape memory materials are used to provide shape/size control to the reconfigurable storage bin. The reconfigurable bins disclosed herein can be of the mesh design or can be formed of panels or a combination thereof. The term panel is not intended to be limited to planar surfaces and is intended to include curvilinear surfaces as well. The reconfigurable storage bin is not intended to be limited to any particular form or shape or dimension. For example, the reconfigurable storage bin can define a sleeve, a pocket, a cupholder, an open ended container, or the like. Examples of panel sided storage bins include, but are not intended to be limited to, door map pockets and that internal to the center console. Examples of mesh like storage bins include, but are not limited to, map pockets, cargo/grocery net holders, pet and sleeping child net restraints, drawer dividers, file cabinets, and the like. Advantageously, the reconfigurable storage bin can be used to hide the bin until needed, can be used to provide a snug fit to the object independent of the size of the object, provides reversible expansion/contraction, and the like.

As used herein, the term "shape memory polymer" generally refers to a polymeric material, which exhibits a change in a property, such as an elastic modulus, a shape orientation, or a combination comprising at least one of the foregoing properties upon application of an activation signal, e.g., a thermal activation signal, a magnetic activation signal, an electrical activation signal, chemical activation signal, or a combination comprising at least one of the foregoing signals. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP.

Referring now to thermoresponsive SMPs, each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

The shape memory polymer may be heated by any suitable means. For example, for elevated temperatures, heat may be supplied using hot gas (e.g., air), steam, hot liquid, or electrical current. The activation means may, for example, be in the form of heat conduction from a heated element/fluid in contact with the shape memory polymer, heat convection from a heated conduit in proximity to the thermally active shape memory polymer, a hot air blower, microwave interaction, laser heating, flash lamp heating, infrared heating, resistive heating, thermoelectric heating, and the like. In the case of a temperature drop, heat may be extracted by using cold gas, cold fluid, evaporation of a refrigerant, thermoelectric cooling, or by simply removing the heat source for a time sufficient to allow the shape memory polymer to cool down via thermodynamic heat transfer. The activation means may, for example, be in the form of a cool room or enclosure, a cooling probe having a cooled tip, a control signal to a thermoelectric unit, a cold air blower, or means for introducing a refrigerant (such as liquid nitrogen) to at least the vicinity of the shape memory polymer.

Optionally, the SMP can be selected to provide stress-induced yielding, which may be used directly (i.e. without heating the SMP above its thermal transition temperature to 'soften' it) to make the article of protective equipment conform to a given surface. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs, and SMPs activated by other methods may readily be used in addition to, or substituted in place of, thermoresponsive SMPs, where appropriate. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity— (for large or small deformations), a high dielectric constant, and the like. In one embodiment, the polymer is selected such that is has an elastic modulus at most of about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films so as to form the panel of the reconfigurable storage bin. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

As mentioned above, the reconfigurable storage bins generally includes a structural component that is at least partially formed from an SMP, SMA, EAP or combination thereof. The SMAs and SMPs have a selected thermal transition temperature whereas a suitable voltage is applied in the case of EAPs at which these shape memory materials undergo a change in its modulus of elasticity and/or shape. The change in the modulus of elasticity either allows (for an unloaded article) or results in (for a loaded article) a change in the shape of at least the structural component. The shape memory polymer or shape memory alloy of the structural component may be in the form of a solid (wire, sheet, slab, etc. being examples of possible geometric shapes), a foam, a non-foam solid with cavities or holes either molded or machined therein, a lattice structure, a hollow bladder structure, a portion or all of a woven/knitted/braided construct, or the like. The EAPs exhibit a similar behavior albeit as a function of applied voltage and will generally have a solid form.

Figure 3:
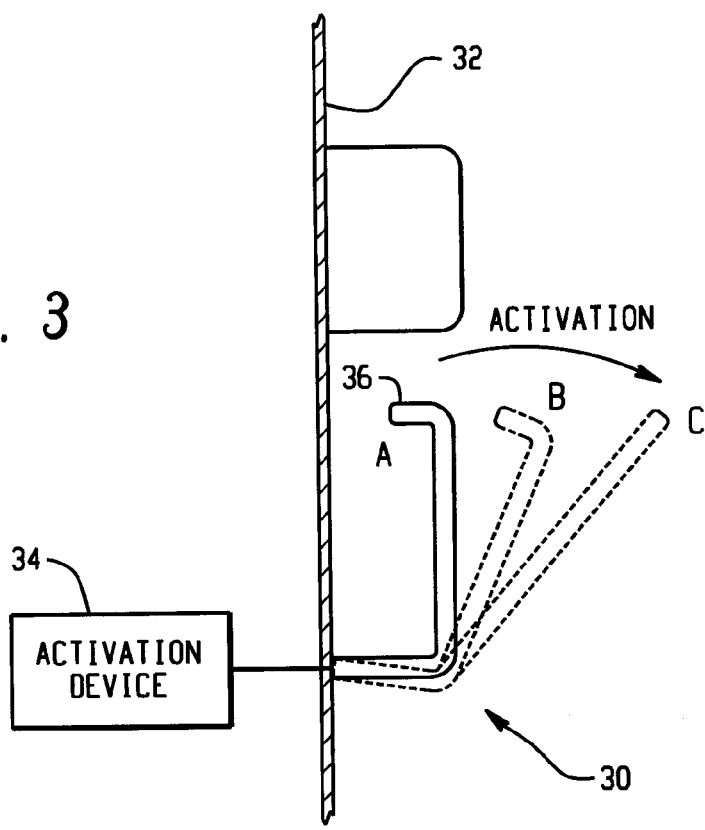
FIG. 3 is a schematic representation of a cross sectional view of a reconfigurable bin taken along lines 3-3 of FIG. 1 and illustrating different opening dimensions upon activation of a shape memory material.

Referring now to FIG. 3 there is illustrated a cross section of an exemplary reconfigurable storage bin generally designated 30. The reconfigurable storage bin 30 is shown mounted to a surface 32, e.g., a door panel or the like. The bin itself has a memorized shape in the form of a molded panel as illustrated by shape A. Using a bin formed of shape memory polymers as an example, the shape memory polymer is in its stiff, glassy form at the ambient temperature within the vehicle, which is below the lowest thermal transition temperature of the SMP. Shape A has a lipped opening of a finite dimension to permit objects having a smaller dimension to be placed therein. To reconfigure the bin to accommodate larger objects, for example, the shape memory material is activated with a suitable activation signal such that its modulus properties and/or the shape change. By way of example, a thermal activation signal can be provided to the shape memory polymer with activation device 34. For example, wires encased in the shape memory polymer can be resistively heated with a suitable current supplied by the activation device to resistively heat the wires to a temperature effective to change the modulus of the shape memory polymer so as to permit the bin to be reconfigured to a different shape, e.g., shape B, shape C and the like. The shape of the bin can then be reconfigured to accommodate a large object and if needed, the lip portion 36 can be reconfigured as shown by shape C. Subsequent cooling of the shape memory polymer while still under load (i.e., while holding the configuration attained at the end of the previous step) brings the SMP back to its stiff glassy form and effectively locks the reconfigured position.

If further adjustment of the shape of the bin is desired or after use of the bin for the larger article is completed, the shape memory polymer that defines the structural component can be reheated to a temperature above the thermal transition temperature. When heated it will attempt to resume its memorized shape unless acted on by an external load or until its movement is blocked by other objects. Examples of means of reshaping (while hot) are pressing against an article of a smaller dimension or different configuration. However, in some cases it may be desirable or necessary (e.g., if the analogous body parts to which the structural component will be configured have changed or are vastly dissimilar) to reset the structural component 30 to its original configuration followed by a training step before the bin is shaped appropriately for its intended use.

In the optional reset step, the structural component formed of the shape memory polymer 30 is unloaded and heated to above the thermal transition temperature. The structural component 10 is held unloaded at that temperature (i.e., with the SMP in the soft, polymeric form), until the bin has regained its original configuration. Since the SMP structural component 30 will have a low stiffness, shape recovery may be assisted by external means. For example, depending on the location, the bin can be reconfigured by gravity loading. Other means of shape recovery assistance can include the use of compressed air, immersion in a fluid, bias mechanisms, and the like. When the shape recovery is complete and/or substantially complete, the reconfigurable bin can be configured to a new shape.

As noted, the dramatic drop in modulus properties would allow for objects slightly to moderately larger than the original space to be inserted into the reconfigurable storage bin. Subsequent cooling (or a reduction or termination of applied voltage as in the case of EAPs) would cause the bin panels to take their new shape and thus securely restrain the article. The article could be removed/released upon reheating the panels. Another example would be panels at the side of a purposely undersized bin—for example for storing compact discs (CDs) that when heated would allow multiple CDs to be inserted in so doing deforming (pocketing the panel) which upon cooling would again lock in the new restraining shape. Thus, added functionality would include both ability to resize/reshape to object and to restrain an object.

Figure 4:
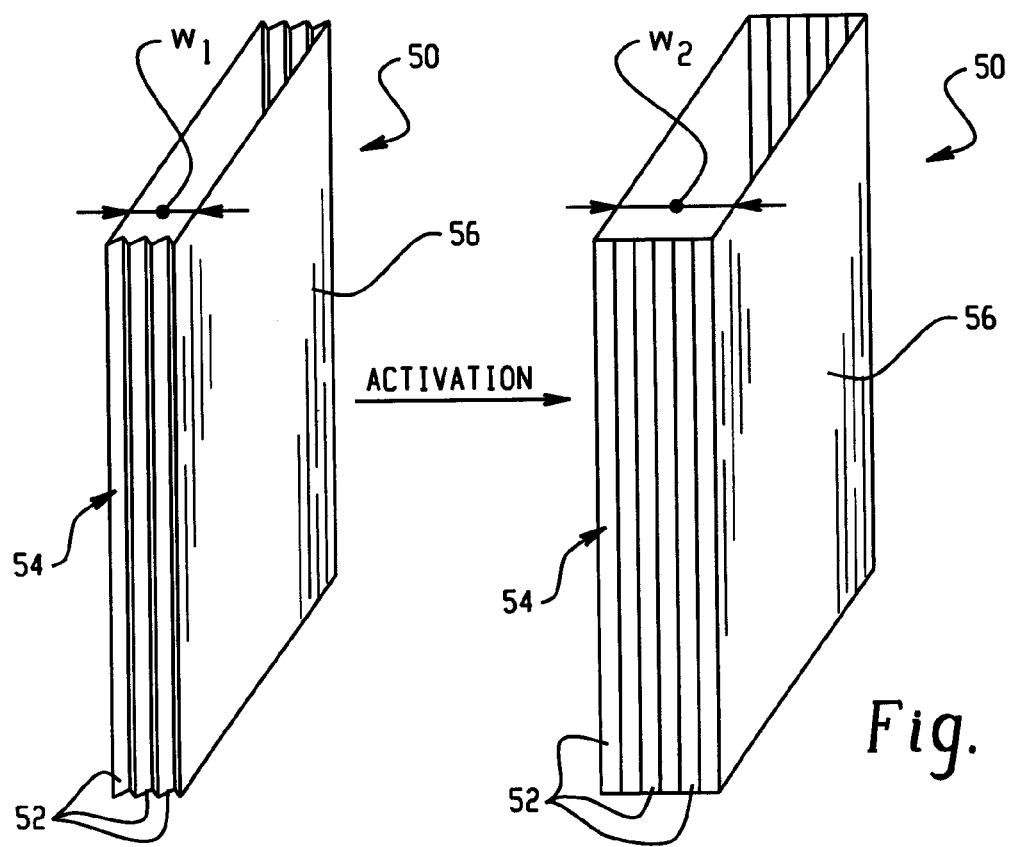
FIG. 4 is a schematic representation of a perspective view of a reconfigurable bin before and after activation of a shape memory material.

In terms of door map pockets, portions or all of the side panels could be made of SMP. For example, as shown in FIG. 4, the reconfigurable bin 50 can includes vertical strips 52 of SMP, e.g., in the form of pleats (three of which are shown,) that define the side panels 54. The front panel 56 (and back panel, if present) can be made of a conventional non-active material. Heating the SMP strips 52 would allow an end user, by pulling on the center section of the map pocket, to stretch the SMP strips in so doing expanding the volume/storage capacity of map pocket from a first width (w1) to a second width (w2). Cooling while held at this expanded position (w2) would lock in this shape. Reheating with force/contents removed would return it to its starting configuration. Reheating with the object within would snug it against the object. Again, depending on the intended configuration and placement of the reconfigurable storage bin using shape memory polymers, it may be desirable to utilize a bias mechanism to restore the bin to its original configuration. In another embodiment, the shape memory material forms the fold lines and would function in a similar manner.

Optionally, the front panel 56 could be made of SMP, SMA, EAP, or a combination thereof. In this case, heating and/or applying a voltage to the panel 56 would allow a large object to be stuffed in whereas subsequent cooling and/or discontinuing the applied voltage would lock in the new conforming shape restraining the object. Reheating (and/or re-applying the voltage as in the case of EAPs) would permit object removal and subsequent restoration of the starting configuration. Still further, all of the sides defining the reconfigurable bin can be formed of SMP, SMA, EAP, or a combination thereof.

Figure 5:
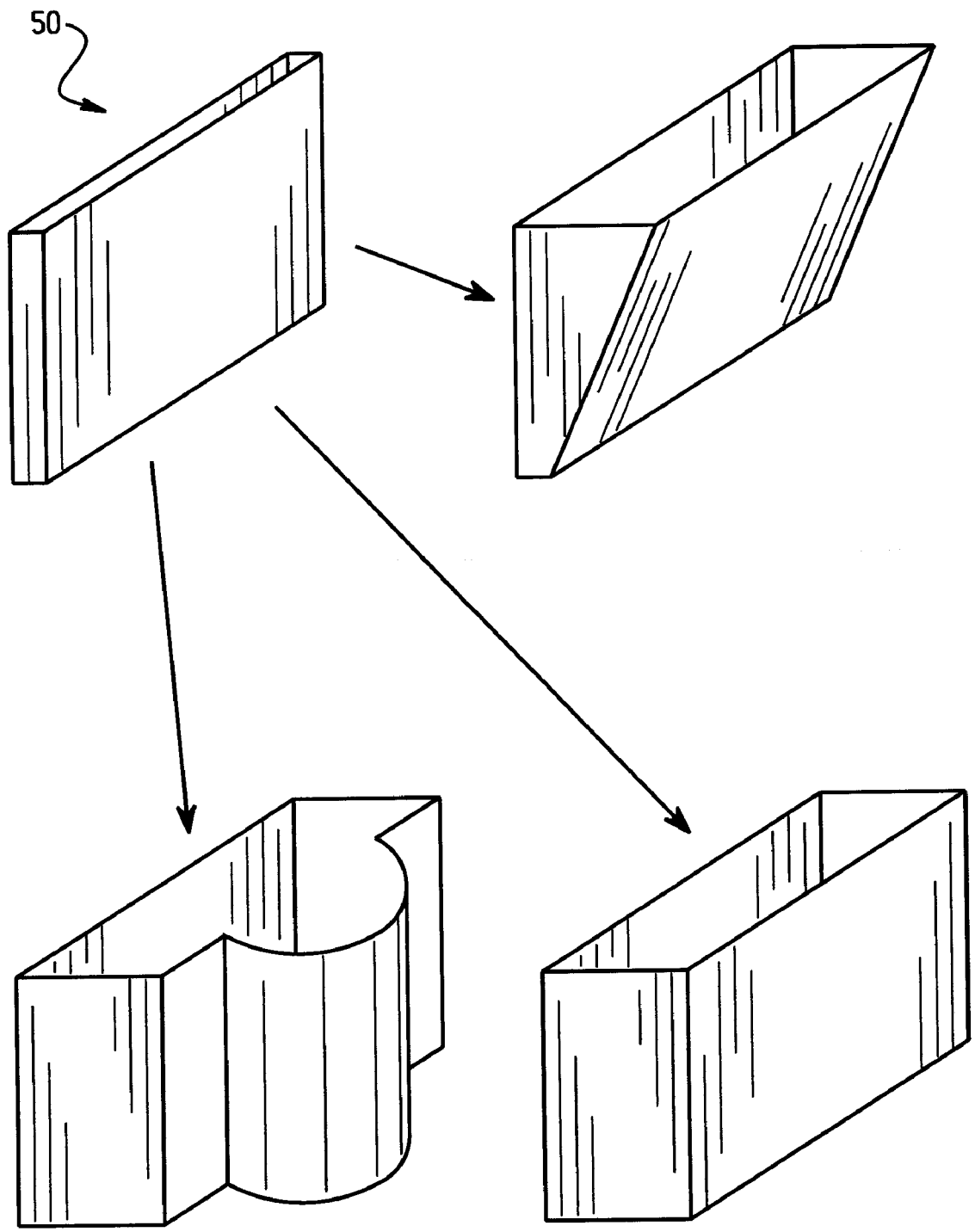
FIG. 5 is a schematic representation of various perspective views illustrating the reconfigurable storage bin prior to activation and examples illustrating exemplary shapes of the reconfigurable bin after activation.

FIG. 5 illustrates various perspective views of the reconfigurable storage bin 30 prior to activation and examples illustrating exemplary shapes of the reconfigurable bin after activation.

For reconfigurable bins comprising shape memory alloys, there are generally two classes of embodiments based on the properties inherent to SMAs. One embodiment, would take advantage of its thermally activated modulus changing properties and shape memory effects as discussed above whereas the other embodiment utilizes its stress induced superelasticity property. Both embodiments involve the SMA being embedded within or in active communication within a flexible matrix material that defines the shape of the reconfigurable material. Any flexible material that does not alter the behavior of the shape memory properties of the SMA can be used including, but not limited to, shape memory polymers. In the first embodiment, stretching of the side panels would plastically deform the SMA thereby permitting the deformation. Subsequent heating of the SMA would snug the panel down around the object in its attempt to return to the SMA's memorized shape. In the second stressing the SMA in the act of trying to expand the pocket/bin would stress the SMA introducing superelasticity—after dropping the object in the bin/pocket and releasing the stress, the SMA would attempt to return to its original geometry automatically without the need for reheating. Depending on the intended application, it may be desirable to employ a bias spring to provide a restoring force.

As previously discussed, examples of panel sided storage bins include door map pockets, cup holders, and the like. At least two different active material based approaches are envisioned. In the first, at least a portion of the side panels would be made of shape memory material with a built in heating mechanism such as a mesh of wires to provide resistive heating upon flow of current. Alternatively, wires formed of the SMA material can be used. Heating the shape memory material formed panels (or portions thereof) above their thermal transition temperature would cause a modulus drop allowing the panels to be easily deformed. In a second embodiment, at least a portion of the side panels would contain SMA wires, ribbon, and the like. The SMA can be embedded within a flexible matrix material or in active communication with a flexible matrix material. One embodiment utilizes the thermally activated shape memory effect in SMA, the other could utilize the stress induced superelastic property of SMA.

It is to be understood of course that hybrid combinations of SMA and SMP and/or EAP can be utilized to reversibly change and lock in a shape in a similar manner.

Although reference has been made to panels, one of skill in the art would recognize that the net configuration would function in a similar manner. Net configurations in which at least a portion of the elements constituting the net is made of either/or/both SMP and SMA are contemplated. Again versions involving both thermally activated modulus and shape change of SMA and stress induced superelasticity of SMA are contemplated.

In terms of activation means, the user would passively activate those involving superelasticity through application of a force through, for example, manual, electromechanical, or magnetic means. Those involving thermal activation, applied voltage or otherwise could be button activated—the heat subsequently being generated/applied through resistive heating of the SMA itself or in the case of SMP through resistive heating of embedded wires, but alternatively through convective, conductive, or radiative heat transfer means from the surrounds. For EAPs, an applied voltage would be utilized for activation.

As used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges directed to the same quantity of a given component or measurement are inclusive of the endpoints and independently combinable While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A reconfigurable storage bin adapted to achieve first and second open configurations further defining first and second fixed volumes or shapes conducive for receiving and storing first and second three-dimensional objects of differing geometric shape, respectively, said bin comprising:
    at least one structural component formed predominantly by a planar sheet of shape memory material configured to undergo a change in a modulus of elasticity and/or shape upon receipt of an activation signal, wherein the change in the modulus and/or shape results in a change in a shape and/or size of the structural component, such that the bin is caused to toggle between the first and second open configurations, said at least one component defines a generally non-enclosed, and non-bifurcated interior space and an open container in the first configuration, and the space and container remain generally non-enclosed and open in the second configuration,
    wherein the bin presents a continuous side wall further comprising at least one panel, and the structural component defines a complete panel.

2. The reconfigurable bin of claim 1, wherein the shape memory material is a shape memory polymer.

3. The reconfigurable bin of claim 2, wherein the shape memory polymer further comprises an electrically conductive wire embedded therein and in electrical communication with a power source.

4. The reconfigurable bin of claim 2, wherein the shape memory polymer is a thermoresponsive shape memory polymer, a photoresponsive shape memory polymer, a moisture-responsive shape memory polymer, or a combination comprising at least one of the foregoing.

5. The reconfigurable bin of claim 1, wherein the shape memory material defines a fold line of the panel, and the change results in modifying the resistance to folding at the line.

6. The reconfigurable bin of claim 1, wherein the activation signal comprises a thermal activation signal, a magnetic activation signal, an electrical activation signal, chemical activation signal, or a combination comprising at least one of the foregoing signals.

7. The reconfigurable bin of claim 1, further comprising an activation device adapted to provide the activation signal to the shape memory material.

8. A reconfigurable storage bin adapted to achieve first and second open configurations further defining first and second fixed volumes or shapes conducive for receiving and storing first and second three-dimensional objects of differing geometric shape, respectively, said bin comprising:
    at least one structural component formed predominantly by a planar sheet of shape memory material configured to undergo a change in a modulus of elasticity and/or shape upon receipt of an activation signal, wherein the change in the modulus and/or shape results in a change in a shape and/or size of the structural component, such that the bin is caused to toggle between the first and second open configurations, said at least one component defines a generally non-enclosed, and non-bifurcated interior space and an open container in the first configuration, and the space and container remain generally non-enclosed and open in the second configuration,
    wherein the structural component defines a complete netting.

* * * * *